United States Defensive Publication [19] (H) [11] T100,902

Hauser [43] Aug. 4, 1981

[54] USES FOR MICROFIBER-BASED WEBS

[76] Inventor: Edward R. Hauser, P.O. Box 33427, Saint Paul, Minn. 55133

[21] Appl. No.: 220,433

[22] Filed: Dec. 29, 1980

[51] Int. Cl.[3] ..... B01D 23/00

[52] U.S. Cl. ..... 210/348; 428/903

[57] ABSTRACT

Microfiber webs and composite webs comprising blends of microfibers and crimped bulking fibers have a variety of uses, including use as thermal insulation for garments as well as various structures such as buildings, tents, refrigerator cabinets, or window shades; acoustic insulation; light weight fillers; various structural members, such as battery separators; filters; and applicators, cloths and wipes. For these and other uses the webs may be combined with other articles such as films or fabrics or other kinds of insulating or lofty webs.

2 Claims, 1 Sheet Drawing,

7 Pages Specification

The file of this unexamined application may be inspected and copies thereof may be purchased (849 O.G. 1221, Apr. 9, 1968).

FILTRATION RESULTS FOR WEBS AS DESCRIBED IN U.S. PATENT NO. 4,118,531 COMPRISING DIFFERENT BLENDS OF POLYPROPYLENE MICROFIBERS AND CRIMPED POLYETHYLENE TEREPHTALATE FIBERS

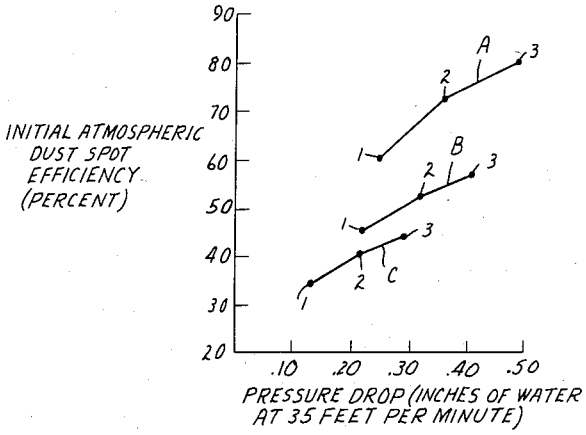

CURVE A IS FOR WEBS WEIGHING 100 g/m²
" B " " " " 70 g/m²
" C " " " " 50 g/m²
POINT 1 " " " COMPRISING 70 WEIGHT % MICROFIBERS
" 2 " " " " 80 " " "
" 3 " " " " 90 " " "

FILTRATION RESULTS FOR WEBS AS DESCRIBED IN U.S. PATENT NO. 4,118,531 COMPRISING DIFFERENT BLENDS OF POLYPROPYLENE MICROFIBERS AND CRIMPED POLYETHYLENE TEREPHTALATE FIBERS
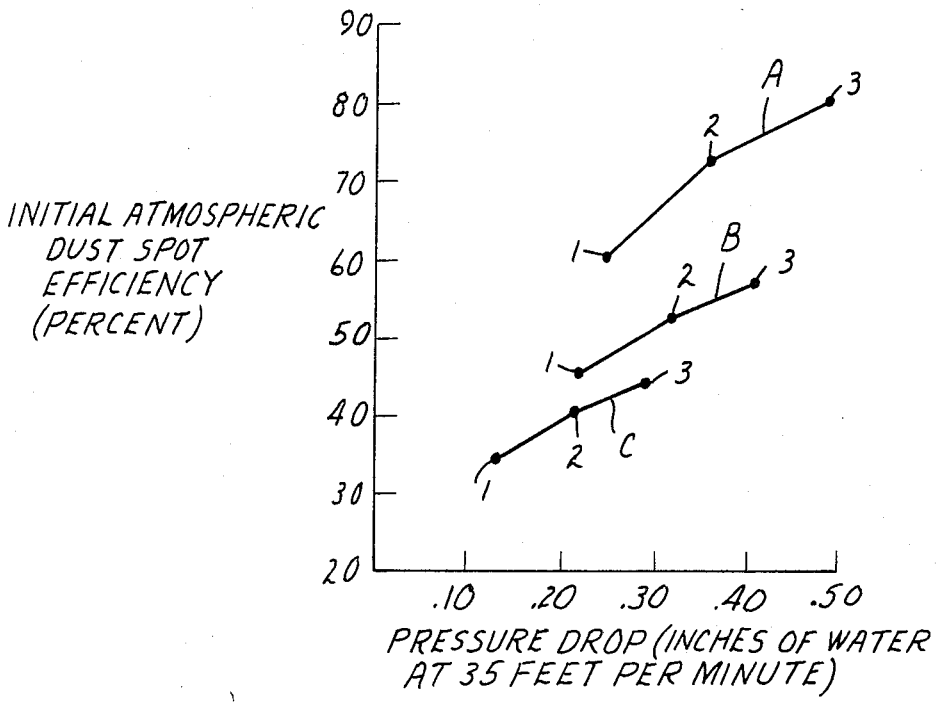
| | | | | | | | | | |
|---|---|---|---|---|---|---|---|---|---|
| CURVE | A | IS | FOR | WEBS | WEIGHING | 100 g/m² | | | |
| " | B | " | " | " | " | 70 g/m² | | | |
| " | C | " | " | " | " | 50 g/m² | | | |
| POINT | 1 | " | " | " | COMPRISING | 70 | WEIGHT % | MICROFIBERS | |
| " | 2 | " | " | " | " | 80 | " | " | " |
| " | 3 | " | " | " | " | 90 | " | " | " |